United States Patent
Walker, Jr. et al.

(10) Patent No.: US 9,116,315 B2
(45) Date of Patent: Aug. 25, 2015

(54) SHIELDED BARREL

(71) Applicant: SigmaPro Engineering and Manufacturing, LLC, Ft. Worth, TX (US)

(72) Inventors: Harold Y. Walker, Jr., Ft. Worth, TX (US); David Underwood, Ft. Worth, TX (US); Paul Hamilton, Atlantic Beach, FL (US)

(73) Assignee: SigmaPro Engineering and Manufacturing, LLC, Fort Worth, TX (US)

( * ) Notice: Subject to any disclaimer, the term of this patent is extended or adjusted under 35 U.S.C. 154(b) by 1 day.

(21) Appl. No.: 14/206,334

(22) Filed: Mar. 12, 2014

(65) Prior Publication Data
US 2014/0270658 A1    Sep. 18, 2014

Related U.S. Application Data

(60) Provisional application No. 61/782,683, filed on Mar. 14, 2013.

(51) Int. Cl.
*G02B 6/42* (2006.01)

(52) U.S. Cl.
CPC ............. *G02B 6/4255* (2013.01); *G02B 6/423* (2013.01); *G02B 6/4204* (2013.01); *G02B 6/4292* (2013.01); *G02B 6/4206* (2013.01); *G02B 6/4263* (2013.01); *G02B 6/4277* (2013.01)

(58) Field of Classification Search
CPC ...................................... G02B 6/4255
See application file for complete search history.

(56) References Cited

U.S. PATENT DOCUMENTS

| | | | | |
|---|---|---|---|---|
| 2006/0051031 A1* | 3/2006 | Walker | | 385/88 |
| 2008/0298752 A1* | 12/2008 | Teo et al. | | 385/92 |
| 2010/0220955 A1* | 9/2010 | Mitamura et al. | | 385/33 |

\* cited by examiner

*Primary Examiner* — Jerry Rahll

(57) ABSTRACT

Embodiments of a barrel for use with fiber optic connections and method of manufacturing are disclose herein. In one embodiment, a barrel comprises a first portion. The first portion having a wedge protruding from a distal end of the first portion at an angle and a component cavity for receiving an opto-electric component therein. The barrel further comprises a second portion having a fiber cavity for receiving one or more fiber cables therein, wherein the second portion is moldably coupled onto the distal end of the first portion around the wedge. The second portion may further comprise a panel interface for mounting the barrel within a panel.

20 Claims, 5 Drawing Sheets

SHIELDED BARREL

CLAIM OF PRIORITY

This application claims priority to Provisional Application No. 61/782,683, filed on Mar. 14, 2013, the entire contents of which are incorporated herein by reference.

TECHNICAL FIELD

This application is directed, in general, to a housing for fiber optic connections, and more specifically, to a shielded barrel for use with fiber optic connections.

BACKGROUND

Fiber optic connectors serve as the mechanical interface between an opto-electric component and an optical fiber. Fiber optic connectors have been made from various materials, most traditionally from brass and then plated with nickel. As volumes produced increased, connectors were then cast from zinc alloy and similarly nickel plated. As the diameters of the glass fibers has decreased, the need for improved optical coupling between the opto-electric component and the optical fiber has increased, resulting in connectors made from molded plastics, such as, for example, a transparent plastic material such as polyetherimide. Such transparent materials are generally temperature and chemical resistant, transmit well in the near-Infrared (IR) range, and can have the necessary optics integrally molded into the body of the connector. Connectors and connector housings made from transparent plastic polymers have been utilized for several years.

SUMMARY

One aspect of the present disclosure provides a barrel which may be used in conjunction with fiber optic connections. The barrel comprises a first portion having a wedge protruding from a distal end of the first portion at an angle and a component cavity for receiving a component therein; and a second portion having a fiber cavity for receiving one or more cables therein, wherein the second portion is moldably coupled onto the distal end of the first portion around the wedge.

In another aspect of the disclosure, a method for manufacturing a barrel for use with fiber optic connections is disclosed. The method comprises Another aspect of the invention provides a fiber optic connection, comprising at least one component; at least one fiber cable; and a barrel. The barrel comprises a first portion having a wedge protruding from a distal end of the first portion at an angle, a component cavity therein for receiving the at least one component, a component-side lens adjacent the component cavity, and at least one fiber-side lens proximate the distal end within the wedge. The barrel further comprises a second portion having a fiber cavity for receiving the at least one fiber cable therein and a panel interface for mounting the barrel within a panel, wherein the second portion is moldably coupled onto the distal end of the first portion around the wedge such that the connecting end of the second portion mates with the distal end of the first portion.

BRIEF DESCRIPTION

Reference is now made to the following descriptions taken in conjunction with the accompanying drawings, in which:

FIG. 3B is a sectional view of the second portion shown in FIG. 3A is a;

DETAILED DESCRIPTION

Figure 1A:
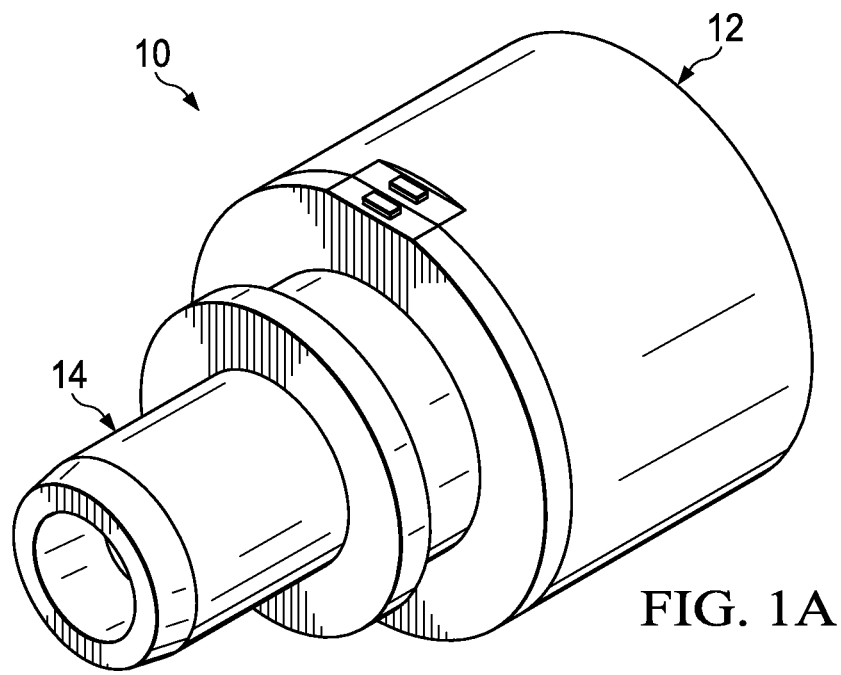
FIG. 1A is a perspective view of one embodiment of a shielded barrel according to the present disclosure.

Previous attempts to provide a shielding for fiber optic connections and connector housings have involved preparing two portions made using two different fabrications, and thereafter fastening the two portions together using adhesives, sonic welding, snap fit, and various other coupling methods. However, the presence of epoxy and other adhesives can chemically interfere with the fiber optic connection and may not have the necessary temperature or mechanical strength to withstand stress encountered during use. Likewise, a snap fit or other mechanical coupling must provide enough mechanical strength to support the connection without interfering therewith. Some attempts to provide shielding have included metal or plastic plating applied over the transparent polymer or alternatively on the interior surface of the polymer; however, there is a lack of continuity in the plating and thus an ineffective electromagnetic shield. Other methods have applied plastic plating on the interior of the connector where the fiber cable is inserted, but the end of the fiber cable is traditionally a ceramic ferrule which can scrape away the plating over time and cause galling, thereby negating and/or reducing the electromagnetic shielding.

The present disclosure provides a shielded barrel which may be used in conjunction with fiber option connections and further provides a method for manufacturing a shielded barrel. The shielded barrel provides improved shielding against interference with data transmission having increased data rates such as electromagnetic interference (EMI) and radio frequency interference (RFI), inter alia. One embodiment comprises a shielded barrel having a first portion and a second portion, wherein the second portion is over-molded onto the first portion. The first portion comprises a component cavity for receiving one or more opto-electric components therein, at least a first and second lens, and a protruding wedge for receiving and retaining the second portion thereon. The second portion comprises a panel interface, a fiber cavity for receiving one or more fiber optic cables therein, and wedge cavity which mates onto the protruding wedge of the first portion.

The two portions of the shielded barrel may be coupled together by molding the second portion onto the first portion. The first portion comprises a component cavity for receiving one or more opto-electric components therein. The first portion may be fabricated from a relatively transparent plastic polymer which may be amber to clear in color. The second portion may be fabricated from the same plastic polymer as the first portion but having metallic filler therein, such as, e.g. stainless steel fiber filler such that the second portion is dark or opaque in color and provides electromagnetic shielding for the fiber optic connection made within the barrel. The second portion may be fabricated from the same or similar polymer materials as the first portion, but in one embodiment, with a shielding material filler, such as, e.g. but not limited to, metallic fiber, incorporated therein to provide an electromagnetic shield for the fiber optic connections made within the barrel between the one or more fiber cables and components connected therein. Embodiments of the optical connector as provided herein provide distinct advantages over conventional connectors that are connected together by epoxy or sonic welding methods, as explained below.

Figure 1B:
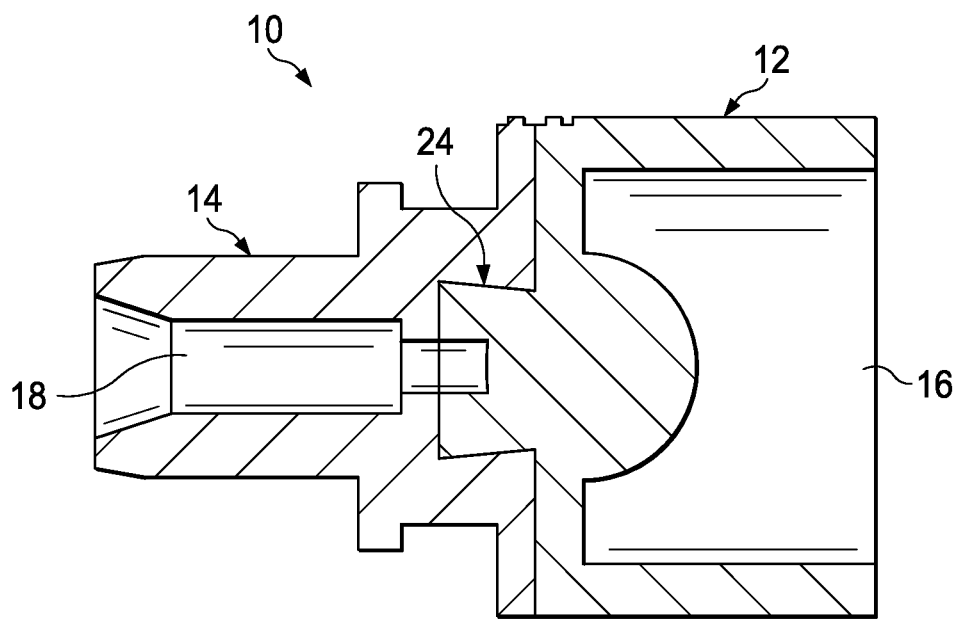
FIG. 1B is a sectional view of the embodiment of a shielded barrel shown in FIG. 1A.
Figure 2A:
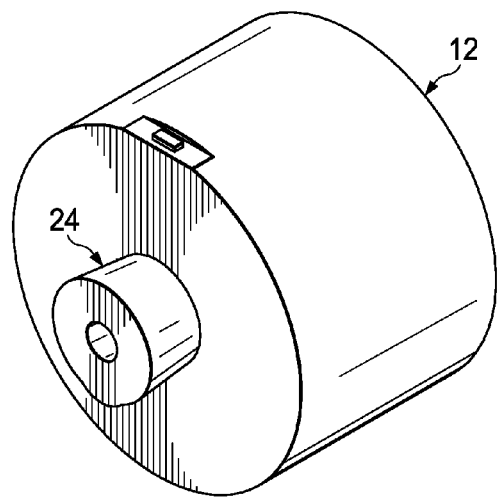
FIG. 2A is a perspective view of a first portion of the embodiment of a shielded barrel shown in FIG. 1A.
Figure 2B:
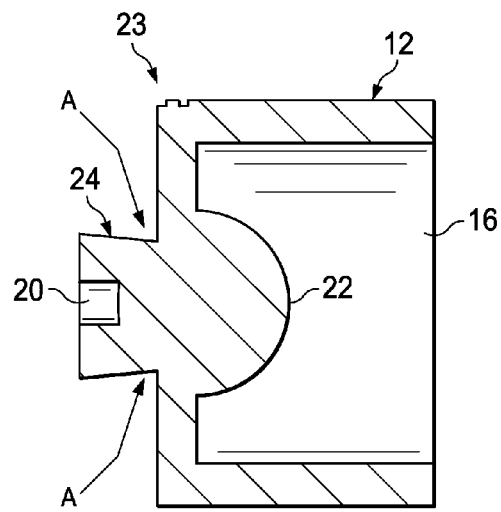
FIG. 2B is a sectional view of the first portion shown in FIG. 2A.

Various embodiments will now be described. Like reference numerals are used throughout the description and several views of the drawings to indicate like or corresponding parts, wherein various elements are not necessarily drawn to scale. Referring now to the drawings and more particularly to FIGS. 1A and 1B, there is shown an embodiment of a shielded barrel 10 which may be used in conjunction with various types of fiber optic connections. The shielded barrel comprises a first and second portion an optical portion 12 and a shielding portion 14. The optical portion 12 comprises a cavity 16 for receiving one or more fiber optic components therein. Likewise, the shielding portion 14 comprises an opening 18 for receiving one or more fiber cables thereinto. Referring now to FIGS. 2A and 2B, there is shown the optical portion 12 in more detail. The optical portion 12 may be fabricated from a relatively transparent material to enable light transfer between fiber-side lens 20 and component-side lens 22. In some embodiments, the fiber-side lens 20 and component-side lens 22 may each comprise a single lens, or in some embodiments, may comprise a plurality of lenses therein to accommodate multi-fiber connections for an array of components and fibers. The optical portion 12 comprises a wedge 24 protruding outwardly from a distal end 23 at an angle A that is less than 90 degrees such that wedge 24 will receive and retain the shielding portion 14 onto the optical portion 12.

In some embodiments, the component-side lens 22 may be molded onto the optical portion 12. In some embodiments, if the shielded barrel 10 is to be utilized for multiple fiber connections, the optical portion 12 may include a plurality of component-side lenses 22. Similarly, one or more fiber-side lenses 20 may be formed onto the shielded portion 14, according to a number of fiber connections for which the shielded barrel 10 may be utilized in conjunction therewith.

Figure 3A:
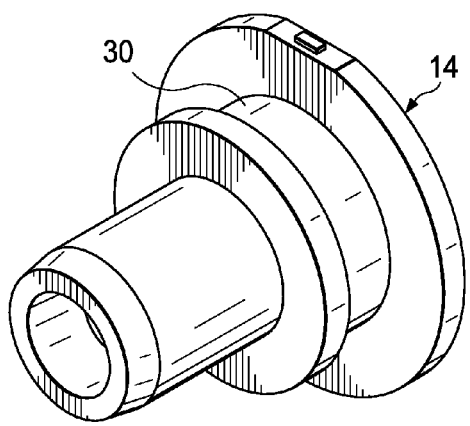
FIG. 3A is a perspective view of a second portion of the embodiment of a shielded barrel shown in FIG. 1A.
Figure 3B:
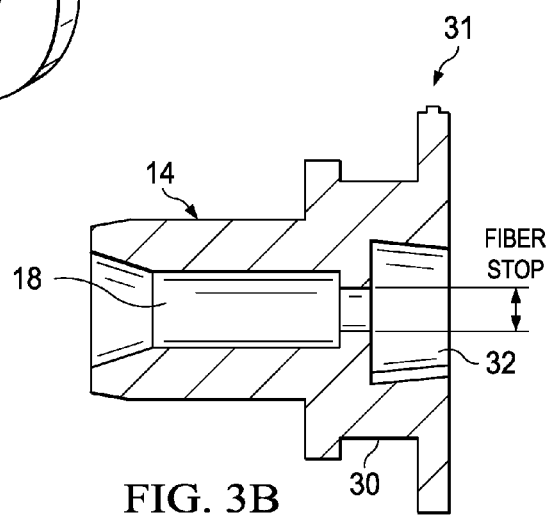

Turning now to FIGS. 3A and 3B, there is shown an embodiment of the shielding portion 14 in more detail. The shielding portion 14 may be fabricated from a material comprising a transparent material which may be substantially similar or the same as the material used to fabricate the optical portion 12, and in one embodiment, it may have a filler material added therein, such that the shielding portion 14 provides electromagnetic shielding for the connection between the fiber cable and the component. In one embodiment, the transparent material is a polyetherimide (PEI) amber thermoplastic such as, e.g., ULTEM®. If a filler material is present, it may be a metallic fiber, such as stainless steel, and various other metal fibers such as silver, nickel, or copper, which are suitable for providing electromagnetic shielding while maintaining moldability and mechanical material strength. Various metals may be used for their conduction and/or oxidizing properties. The ratio of filler material to transparent material may vary according to a desired level of electromagnetic shielding and moldability needed during an injection molding fabrication process. The more filler material used with the polymer, the more shielding provided, but the material becomes more difficult to mold as more metallic fiber is included.

The shielding portion 14 comprises an indented collar 30 at a panel end 31 for interfacing the shielded barrel with a module or panel housing installation. A wedge receiving cavity provides for mating and molding over the wedge 24 of the optical portion 12. As shown in FIG. 3B, the shielding provided by the body of the shielding portion 14 will completely surround the end of the one or more fiber cables inserted therein and thereafter shield the connection with the component inserted into optical portion 12.

The optical portion 12 is fabricated using the polymer material, using a molding process, such as injection molding. The shielding portion 14, fabricated using the polymer material having the metallic fiber incorporated therein, is thereafter over molded onto the optical portion 12. The protruding wedge 24 of the optical portion 12 mechanically retains the shielding portion 14 in place without the use of any foreign materials such as adhesives, etc. The filler incorporated into the material comprising the shielding portion 14 provides a more consistent and effective electro-magnetic shield than has been available with traditional fiber optic connectors. Although the polymer base used for fabricating the optical portion 12 and shielding portion 14 are the same or substantially similar in some embodiments, different polymers may be used as long as the polymer selected for the optical portion 12 has a melting point equal to or higher than the polymer utilized for the shielding portion 14. In addition to the mechanical tension fit provided by the wedge 24 and the fabrication of over-molding the shielding portion 14 over the optical portion 12, as the polymer cools down, the polymer will shrink, further securing the shielding portion 14 onto the optical portion 12. The conventional practices and methods for injection molding processes may be utilized in the fabrication and processing of the optical portion 12 and for the fabrication and over molding of the shielding portion 14. As shown in FIGS. 2A and 2B, possible placement for injection molding gates are shown for both the optical portion 12 and the shielding portion 14.

Figure 4A:
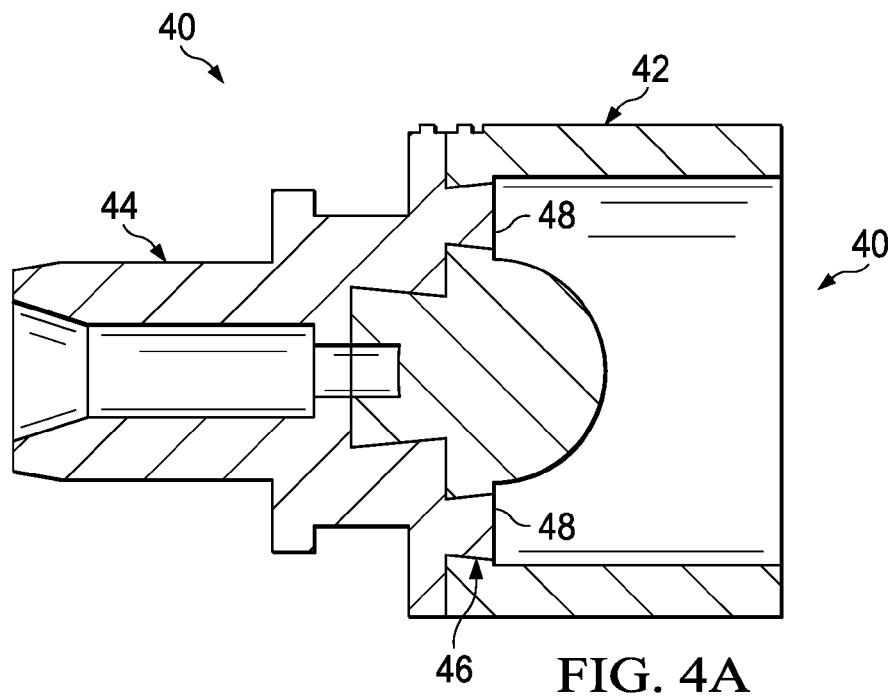
FIG. 4A is a perspective view of another embodiment of a shielded barrel according to the present disclosure.
Figure 4B:
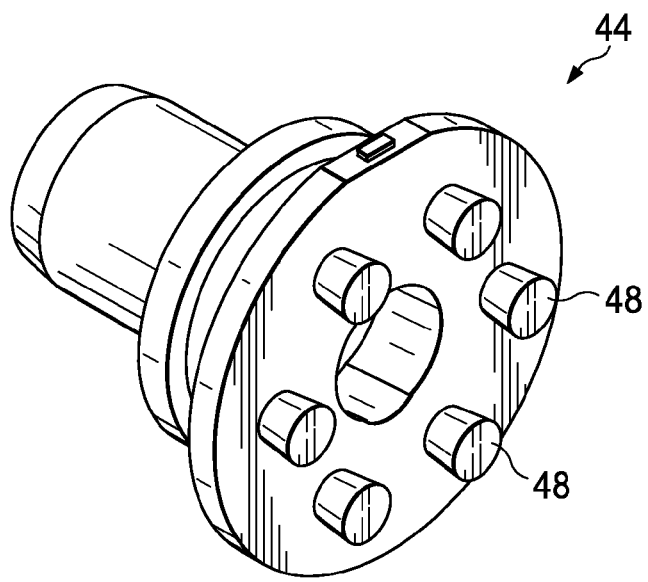
FIG. 4B is a sectional view of the another embodiment of a shielded barrel shown in FIG. 4A.

Referring now to FIGS. 4A and 4B, there is shown an alternate embodiment of a shielded barrel 40. The barrel 40 comprises an optical portion 42 and shielded portion 44 similar in properties and construction to optical portion 12 and shielded portion 14. However, optical portion 42 comprises one or more additional apertures 46 for receiving one or more protrusions 48 from the shielded portion 44.

Figure 5A:
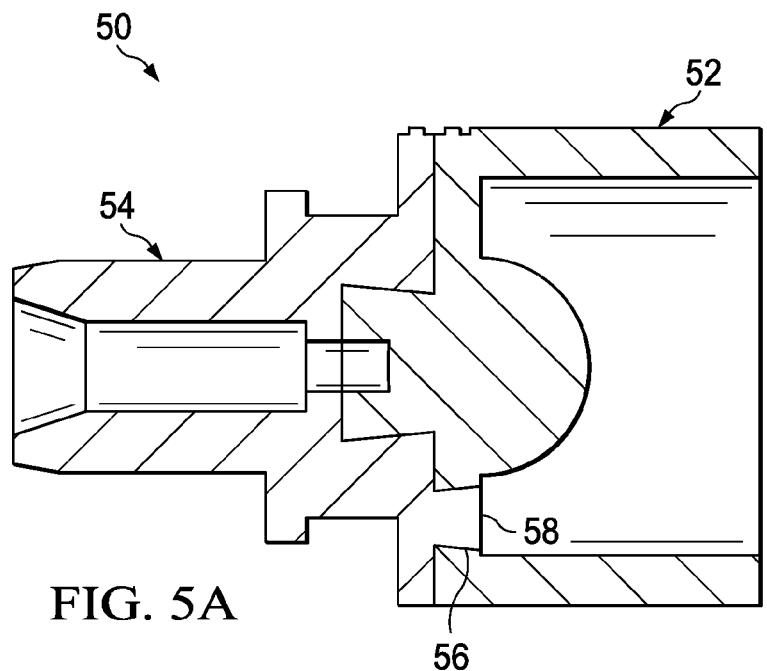
FIG. 5A is a perspective view of yet another embodiment of a shielded barrel according to the present disclosure.
Figure 5B:
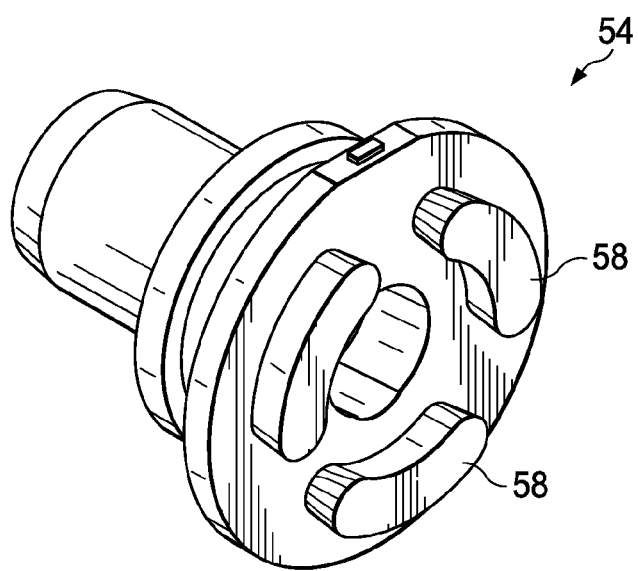
FIG. 5B is a sectional view of the yet another embodiment of a shielded barrel shown in FIG. 5A.

Referring now to FIGS. 5A and 5B, there is shown another embodiment of a shielded barrel 50 according to the present disclosure. The barrel 50 comprises an optical portion and shielded portion 54 similar in properties and construction to optical portion 12 and shielded portion 14. However, optical portion 52 comprises one or more additional apertures 56 for receiving one or more protrusions 58 from the shielded portion 54.

Figure 6A:
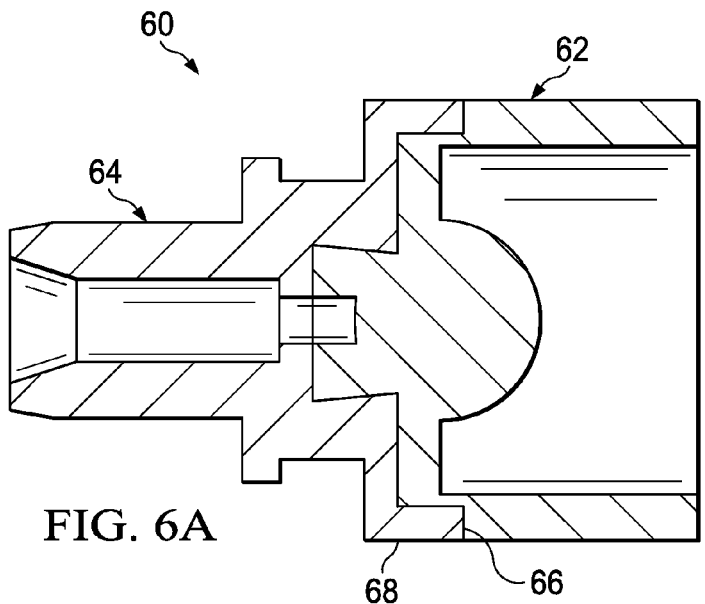
FIG. 6A is a perspective view of still another embodiment of a shielded barrel according to the present disclosure.
Figure 6B:
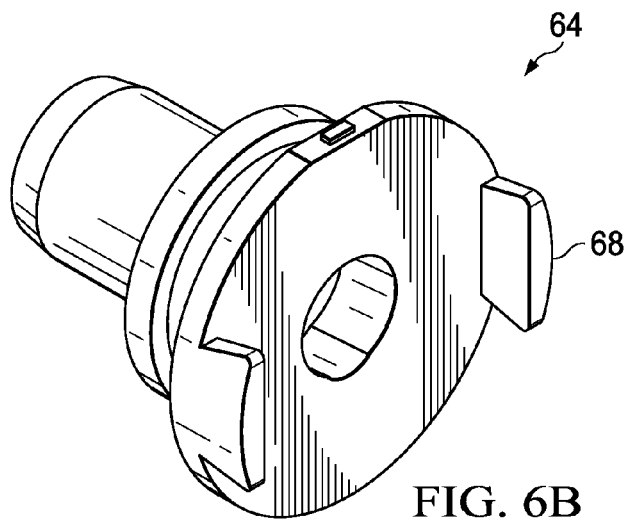
FIG. 6B is a sectional view of the still another embodiment of a shielded barrel shown in FIG. 6A.

Referring now to FIGS. 6A and 6B, there is shown yet another embodiment of a shielded barrel 60 according to the present disclosure. The barrel 60 comprises an optical portion and shielded portion 64 similar in properties and construction to optical portion 12 and shielded portion 14. However, optical portion 62 comprises one or more additional apertures 66 for receiving one or more protrusions 68 from the shielded portion 64.

Figure 7:
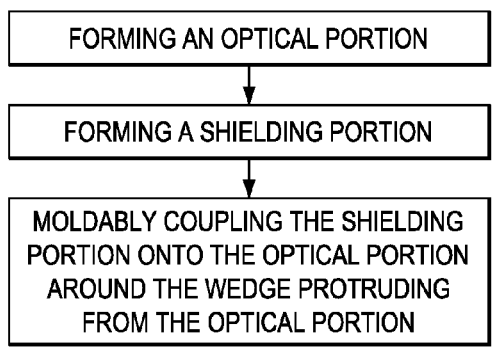
FIG. 7 illustrates a method for manufacturing a shielded barrel according to the present disclosure.

Referring now to FIG. 7, there is shown a method for fabricating a shielded barrel according to the present disclosure. A first portion is formed. The first portion having a component cavity for receiving a component therein. The first portion has a distal end having a wedge protruding therefrom at an angle A. The first portion may be formed using an injection molding process or other suitable manufacturing process. The second portion is formed, having a fiber cavity therein for receiving one or more fiber cables therein. The second portion may also be fabricated using an injection molding process, wherein the second portion is molded over the wedge and onto the first portion such that the first portion and second portion are moldably coupled together. In some embodiments, the moldably coupling of the second portion onto the first portion occurs during and substantially simultaneous to the forming of the second portion. Likewise, in some embodiments the first and second portions may be formed simultaneously in a same manufacturing process. The size of the barrel and number of lenses formed into the first portion may be modified and configured to various sizes and configurations according to various panel configurations, components, and number of fiber cables and fiber connections for which the barrel will be used.

Those skilled in the art to which this application relates will appreciate that other and further additions, deletions, substitutions and modifications may be made without departing from the scope of the present disclosure.

We claim:

1. A barrel for use with fiber optic connections, comprising:
   a first portion having a wedge protruding from a distal end of said first portion at an angle and a component cavity for receiving a component therein; and
   a second portion having a fiber cavity for receiving one or more cables therein;
   wherein said second portion is moldably coupled onto said distal end of said first portion around said wedge.

2. The barrel according to claim 1, wherein said first portion is fabricated from a polymer material.

3. The barrel according to claim 2, wherein said second portion is fabricated from said polymer material having a filler added thereto.

4. The barrel according to claim 3, wherein said filler comprises metal.

5. The barrel according to claim 2, wherein said polymer material is substantially transparent.

6. The barrel according to claim 1, wherein said second portion further comprises a panel interface.

7. The barrel according to claim 1, wherein said first portion comprises at least one component side lens adjacent the component cavity and at least one fiber side lens proximate said distal end portion within said wedge.

8. The barrel according to claim 1, wherein said angle at which said wedge protrudes is less than 90 degrees.

9. The method according to claim 1, wherein said angle at which said wedge protrudes is less than 90 degrees.

10. A method of manufacturing a barrel for use with fiber optic connections, the method comprising:
    forming a first portion having a wedge protruding from a distal end of said first portion at an angle and a component cavity for receiving a component therein;
    forming a second portion having a fiber cavity for receiving one or more cables therein; and
    moldably coupling said second portion onto said first portion around said wedge.

11. The method according to claim 10, wherein said first portion is formed using a polymer material.

12. The method according to claim 11, wherein said second portion is formed using said polymer material having a filler added therein.

13. The method according to claim 12, wherein said filler comprises metal.

14. The method according to claim 11, wherein said polymer material is substantially transparent.

15. The method according to claim 10, wherein said first portion comprises at least one component side lens adjacent the component cavity and at least one fiber side lens proximate said distal end portion within said wedge.

16. The method according to claim 10, wherein said second portion further comprises a panel interface.

17. The method according to claim 10, wherein said moldably coupling said second portion onto said first portion occurs during said forming said second portion.

18. A fiber optic connection, comprising:
    at least one component;
    at least one fiber cable; and
    a barrel, said barrel comprising:
        a first portion having a wedge protruding from a distal end of said first portion at an angle, a component cavity therein for receiving said at least one component, a component-side lens adjacent said component cavity, and at least one fiber-side lens proximate said distal end within said wedge; and
        a second portion having a fiber cavity for receiving said at least one fiber cable therein and a panel interface for mounting said barrel within a panel;
        wherein said second portion is moldably coupled onto said distal end of said first portion around said wedge such that said connecting end of said second portion mates with said distal end of said first portion.

19. The fiber optic connection according to claim 18, wherein said first portion is formed using a polymer material and said second portion is formed using said polymer material having a filler added therein.

20. The fiber optic connection according to claim 18, wherein said second portion comprises a panel interface for mounting said barrel within a panel.

* * * * *